INVENTOR
HELMUTH FRENK
BY
Krafft & Wells
ATTORNEYS

INVENTOR
HELMUTH FRENK
BY
Krafft & Wells
ATTORNEYS

United States Patent Office 3,562,795
Patented Feb. 9, 1971

3,562,795
DIGITALLY INDICATING DOUBLE-BEAM PHOTOMETER
Helmuth Frenk, Wetzlar, Germany, assignor to
Ernst Leitz G.m.b.H., Wetzlar, Germany
Filed May 22, 1967, Ser. No. 640,102
Claims priority, application Germany, June 2, 1966,
L 53,758
Int. Cl. G01j *1/58;* G01n *21/38*
U.S. Cl. 356—222     5 Claims

ABSTRACT OF THE DISCLOSURE

In a digitally indicating double-beam photometer having at least one photoelectric receiver two saw tooth generators are employed. Each saw tooth generator is responsive to one beam and is controlled by electrical signals corresponding to the light intensity of the beam to which it is attached. The ratio of the electrical values determining the rise time of the saw tooth generators is $1:n$, wherein $n$ represents the light intensity of the comparison beam as measured in digital units. The output signal of the saw tooth generator to the comparison beam controls a relay after having been suitably amplified; the output signal of the saw tooth generator responsive to the measuring beam operates a counter mechanism.

A first embodiment is disclosed in which two photoelectric receivers are employed, one in the path of each beam. Each one of the receivers is connected to one of the saw tooth generators.

A further embodiment is disclosed in which only one photoelectric receiver is employed with the two beams being alternately switchable onto the only receiver. A double throw switch is connected to the receiver and is adapted to connect the receiver to either of the saw tooth generators alternately and synchronously with the switching of the beams.

CROSS-REFERENCE TO RELATED APPLICATION

Applicant claims priority under 35 U.S.C. 119 for application No. L 53 758 IXa/42h filed June 2, 1966 in the Patent Office of the Federal Republic of Germany.

BACKGROUND OF THE INVENTION (1) Field of the invention

My present invention relates to comparison photometers; more specifically my invention relates to comparison photometers of the double beam type.

(2) Description of the prior art

Photometers having alternating light beams and being operable by mechanically switching the light beams are already known in the art. However, these photometers comprise either oscillating or rotating elements which may easily be damaged by rough treatment of the apparatus. Other methods of measurement require very complicated photometers and may for this reason not be suitable for all purposes.

SUMMARY OF THE INVENTION

It is therefore an object of my invention to provide a double-beam photometer simple in design, mechanically rugged and electrically reliable which presents the result of the measurement as a numerical value. Tolerances of 1 digit are to be allowed.

This object is achieved by disposing one photoelectric receiver each in the path of the measurement beam and in the path of the comparison beam, and by connecting a saw tooth generator to either photoelectric receiver. The ratio of the electrical values determining the rise time of the saw tooth generators is $1:n$, wherein $n$ represents the light intensity of the comparison beam as measured in digital units. An amplifier and a relay are in this order in connection with the saw tooth generator attached to the comparison beam, and a counter mechanism is connected to the saw tooth generator attached to the measurement beam.

According to another feature of my invention instead of two photoelectric receivers only one may be employed on which the measurement beam and the comparison beam are caused to impinge alternately. A double throw switch is connected with the only receiver and is adapted to connect the receiver alternately to either one of the saw tooth generators synchronously with the alternately impinging beams on the receiver.

According to still another feature of my invention the alternate switching of the two beams onto the photoelectric receiver may be achieved by alternately switching two lamps on and off. To this end two gas-discharge lamps may be used to advantage, one of which is ignited by the positive half-wave and the other one by the negative half-wave of the A.C. with which they are charged.

DESCRIPTION OF THE DRAWINGS

The invention can best be explained with reference to the accompanying drawings, wherein.

DESCRIPTION OF THE PREFERRED EMBODIMENTS

Figure 1:
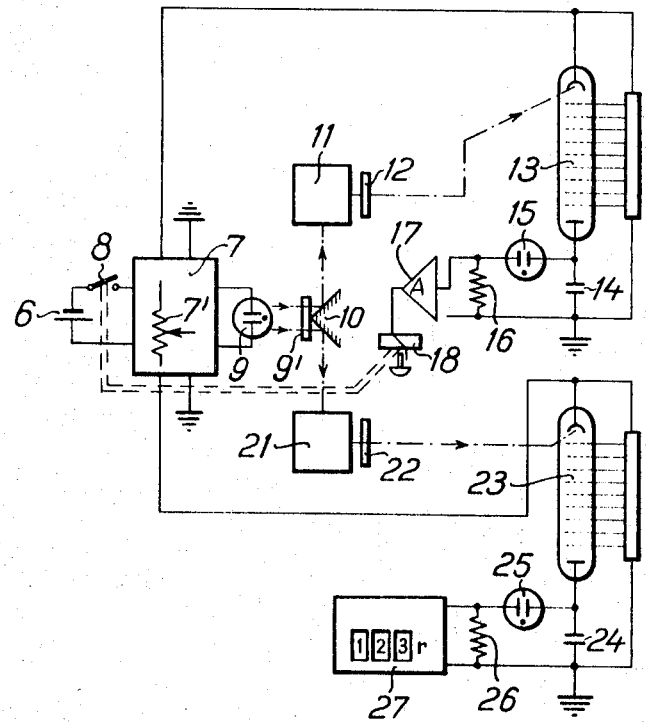
FIG. 1 shows schematically a first embodiment of the invention with two photoelectric receivers employed, one in the path of the measurement beam, the other one in the path of the comparison beam.

A first embodiment of my invention is shown in FIG. 1 where a photometer for the evaluation of glasses for X-ray dosimetry is illustrated. As is known to those skilled in this particular art, glasses for X-ray dosimetry are used as indicators for irradiation of X-rays, especially for the amount of X-rays to which the glasses have been exposed. It is a characteristic property of these glasses to luminesce with different intensity proportionally to the amount of X-rays to which they have been exposed, when the glasses are stimulated by ultraviolet light rays. By stimulating a reference glass where the amount of X-rays to which it had been exposed previously is known and by stimulating a glass to be measured both with the same intensity of ultraviolet light rays it is therefore determined by photometrically comparing the luminescence of both glasses, to what amount of X-rays the glass to be measured had been exposed.

As mentioned before, the invention is illustrated by way of a photometer as is used for comparing the luminescence of said glasses. Since the luminescence of the glass varies proportionally to the amount of X-rays to which it has been exposed, the quantity of such luminescence is referred to in terms of the quantity of X-rays producing such luminescence. Thus a glass exposed to X-rays in the amount of 100 roentgens will be considered to have a 100 roentgen-luminescence.

Two photoelectric receivers 23, 13 are employed; the first one being located in the path of the comparison beam, the second one being located in the path of the measurement beam. These two receivers —as well as a mercury vapor lamp 9—are charged by a battery 6 via a contact 8 and a DC–DC-converter 7 which comprises a chopper. The lamp 9 is provided with an ultraviolet transmitting filter 9'. The light rays emitted by lamp 9 are split into two portions by the beam splitter 10. One portion is used to stimulate a reference glass 11, and the other portion is used to stimulate the glass to be measured. The stimulated luminescene radiation from the reference glass 11 impinges on a multiplier 13 after having passed through an orange filter 12. A saw tooth generator is connected to said multiplier, said generator consisting of the capacitor 14, the neon lamp 15 and the resistor 16. An amplifier 17 is controlled by said saw tooth generator. The output of this amplifier interrupts the locking of the manually operated relay 18.

The luminescent radiation of the object is to be measured 21 being in the measured path impinges on the multiplier 23 after having passed through the orange filter 22. A saw tooth generator is connected to said multiplier 23, said generator consisting of capacitor 24, a neon lamp 25 and a resistor 26. This generator controls a counter mechanism 27 which is capable of being re-set to zero.

It may, now, be assumed that both multipliers 13 and 23 are of identical electrical values. It may further be assumed that the standard glass 11 had been exposed to X-rays of 100 roentgens and that the reading is to be obtained in roentgens. In this case $n=100$.

If the glass to be measured has also been exposed to X-rays of 100 roentgens the same current flows in both multipliers after the self-locking circuit of relay 18 has been operated manually, thereby closing contact 8. If the capacity of capacitor 24 has been chosen to equal $1/100$ of the capacity of capacitor 14 the saw tooth generator 24, 25, 26 which is connected to the multiplier 23 in the path of the measurement beam will rise 99 times and only the 100th rise will coincide with the first rise of the saw tooth generator 14, 15, 16. This rise pulse of generator 14, 15, 16 is amplified by amplifier 17 and then interrupts the locking of relay 18, thereby switching off the apparatus. The reading of the counter mechanism is now "$100r$."

If, generally speaking, the reference glass 11 has been exposed to X-rays of $n$ roentgens, the multiplier's 13 current will be $i_0=K_1 \cdot n$, wherein $K_1$ represents the sensitivity of the multiplier 13. The time needed for one measurement which is determined by the rise time of generator 14, 15, 16 is given by the equation $$t_0 = \frac{n \cdot C_{14} \cdot U_0}{K_1 \cdot n}$$

wherein $U_0$ represents the rise voltage of the generator 14, 15, 16 and $C_{14}$ represents the capacity of capacitor 14. If now a glass to be measured is put into the photometer which had been exposed to X-rays of X roentgens the current in the multiplier 23 will be $i_x=K_2 \cdot X$, wherein $K_2$ represents the sensitivity of the multiplier 23. The rise time of the generator 24, 25, 26 is given by the equation $$t_x = \frac{C_{24} \cdot U_0}{K_2 \cdot X}$$

The generator 24, 25, 26 will therefore rise as many times as $t_0$ is larger than $t_x$.

$$\frac{t_0}{t_x} = \frac{C_{24} \cdot U_0}{K_1} \cdot \frac{K_2 \cdot X}{C_{24} \cdot U_0} = \frac{K_2}{K_1} \cdot X$$

If both multipliers are of identical electrical properties $K_1$ will equal $K_2$ and the X which is to be determined will be the direct reading of the counter mechanism. The ratio of the sensitivies $K_1$ and $K_2$ may be adjusted by way of a potentiometer 7' incorporated into the DC–DC-converter 7.

Let it now be assumed that the reference glass 11 had been exposed to X-rays of $n=275$ roentgens. In this case there is no need for proportioning the capacity $C_{14}$ of capacitor 14 257 times larger than the capacity $C_{24}$ of capacitor 24. Rather by variation of the sensitivities and by appropriate dimensioning of the capacitors it may even with different igniting voltages $U_{13}$ of lamp 15 and $U_{23}$ of lamp 25 of the two saw tooth generators be achieved that the ratio $$\frac{C_{14} \cdot U_{13} \cdot K_2}{C_{24} \cdot U_{23} \cdot K_1} = 1$$

which means that the time ratio $t_0/t_x$ will be X.

In calibrating the device it is only necessary to balance the reading of the counter mechanism against a known value. The machine is balanced by adjusting the potentiometer until the reading of the counter mechanism is equal to the known value of X-rays to which a calibration standard glass has been subjected. The calibration standard glass is inserted in the path of the measuring beam to calibrate the device and then removed to permit normal operation of the device.

Figure 2:
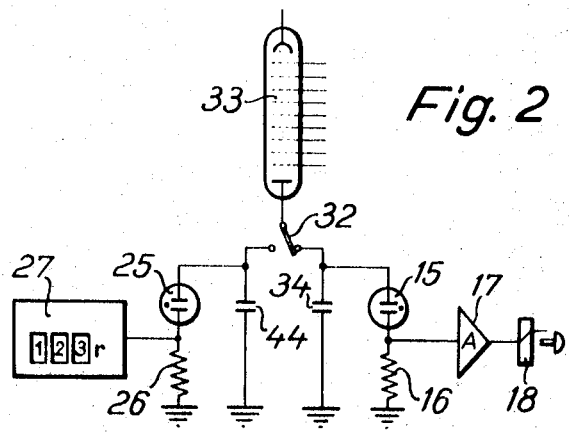
FIG. 2 shows schematically a detail of a second embodiment of the invention in which only one photoelectric receiver is employed.

In FIG. 2 a device is illustrated which works according to the same method as outlined with reference to FIG. 1. However, in the embodiment according to FIG. 2 only one multiplier 33 is employed onto which the measurement beam and the comparison beam are directed alternately. The multiplier 33 is provided with the double throw switch 32 which is actuated synchronously with the alternation of the measurement and comparison beams. To one terminal of the double throw switch 32 a saw tooth generator is connected which consists of the neon lamp 15, the resistor 16 and the capacitor 34. As already mentioned in connection with the embodiment according to FIG. 1 the output signal of said generator actuates relay 18 after amplication by amplifier 17.

Of the two capacitors 34, 44 the first one has $n$-times the capacity of the last one and by switching the double throw switch 32 said capacitors are charged alternately. The switching frequency of switch 32 has to be equal or higher than the highest rise frequency of generator 25, 26, 44.

Figure 3:
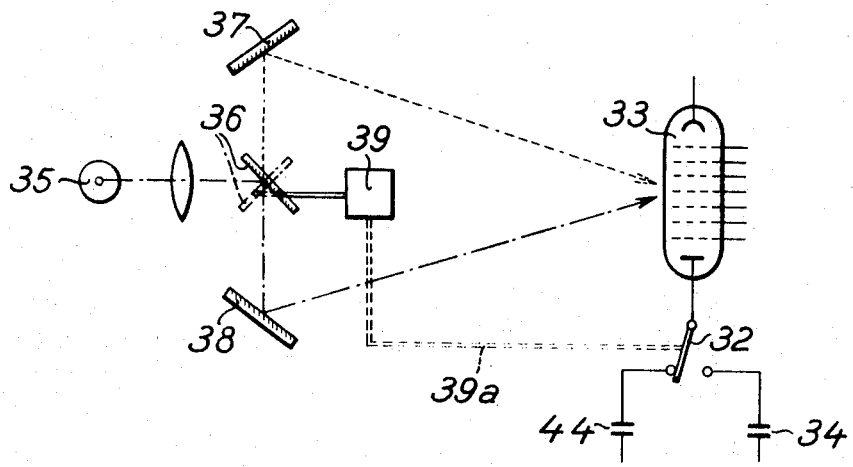
FIG. 3 shows a first means for alternately directing the measurement beam and the comparison beam onto said only photoelectric receiver.

Alternately directing the measurement beam and the comparison beam onto the multiplier 33 can be accomplished in various ways and by various means. As illustrated in FIG. 3 a device may be used in which the light from a light source 35 impinges on a pivotable mirror 36 which is capable of assuming two different positions. In one position the light is reflected onto a rigidly mounted mirror 37 and from there to the reference glass 11 wherein the standard luminescence is stimulated. These luminescent rays constitute the comparison beam and impinge in turn on the multiplier 33.

In the other position of the mirror 36 the light from the light source 35 is reflected to the stationary mirror 38 from where it is reflected to the glass to be measured. The luminescent rays stimulated in this glass constitute the measurement beam and are also directed to impinge on the multiplier 33.

For sake of simplicity the reference glass and the glass to be measured are omitted in the FIGS. 3, 3a, 4 and 5.

By means of an electrically operated driving mechanism 39 the mirror 36 may be pivoted to assume the two positions as indicated in FIG. 3, thereby reflecting the light flux from the light source 35 alternately to the stationary mirrors 37 and 38. The signal at the output of multiplier 33 will thus be generated alternately by the comparison beam and the measurement beam.

As indicated by the dotted line 39a in FIG. 3 a driving connection exists between the driving mechanism 39 and the double throw switch 32 so that when the mirror 36 is pivoted the switch 32 is actuated simultaneously. As a result of this arrangement the multiplier 33 is always connected to the capacitor 44 when the measurement beam is stimulated and, on the other hand, to the capacitor 34 when the comparison beam is stimulated.

Figure 3A:
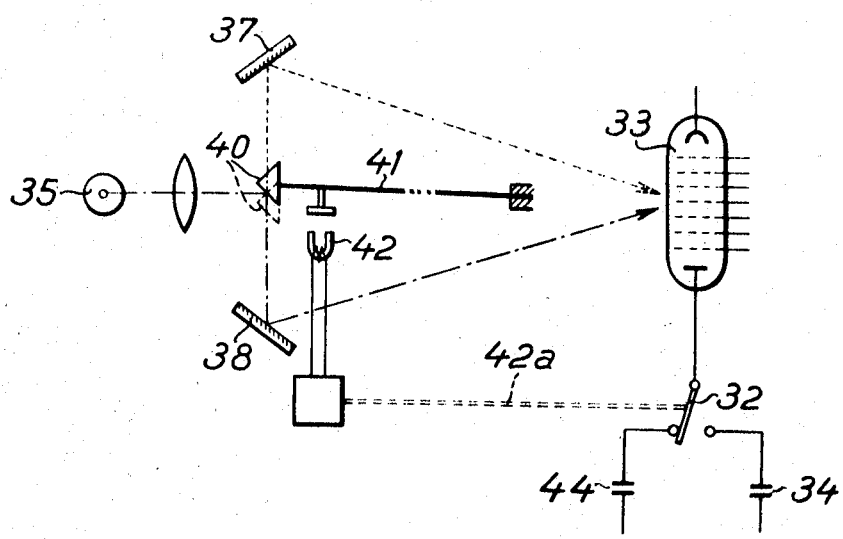
FIG. 3a shows a second means for alternately directing the measurement beam and the comparison beam onto said only photoelectric receiver.

As is illustrated in FIG. 3a, instead of the mirror 36 a prism 40 may be used for alternately directing the light from source 35 to the mirrors 37 and 38. Said prism 40 is suspended by the leaf spring 41 and is operated by the electromagnetic system 42. The latter serves to displace the prism 40 laterally between two end positions. In one of these end positions one reflecting surface of the prism reflects the light to mirror 37, and in the other end position the other reflecting surface reflects the light to mirror 38. A driving connection 42a is illustrated between the electromagnetic system 42 and switch 32 in order to indicate that switch 32 is again operated synchronously with the displacement of prism 40.

Figure 4:
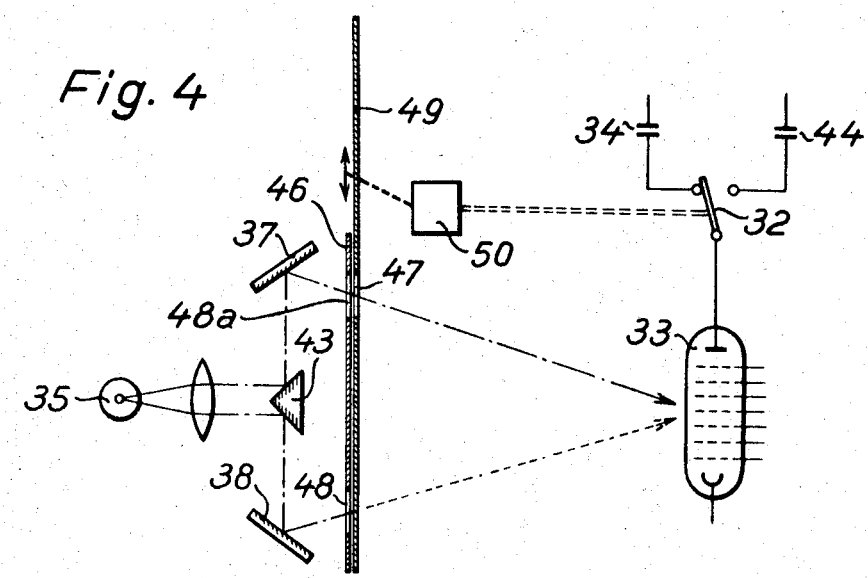
FIG. 4 shows a third means for alternately directing the measurement beam and the comparison beam onto said only photoelectric receiver.

FIG. 4 shows an embodiment in which the light from source 35 is split into two portions by the stationary prism 43. One of said portions is reflected to mirror 37, the other portion is reflected to mirror 38. As described before, the light impinging on mirror 37 is reflected to the reference cell (not shown) and onto the multiplier 33, whereas the light impinging on mirror 38 is directed to the glass to be measured and from there also onto the multiplier 33.

As a means for alternately allowing only either the measurement beam or the comparison beam to impinge on the multiplier 33 two shutter blades 46, 49 are employed. Blade 46 is mounted rigidly and is provided with two apertures 48, 48a in the path of each beam. Blade 49 is provided with only one aperture 47 and is movable in parallel to blade 46. A driving mechanism 50 is in connection with blade 49 and is adapted to displace said blade 49 laterally in order to bring aperture 47 alternately in alignment with aperture 48 and 48a. According to the position of aperture 47 it is either the comparison beam or the measurement beam which is allowed to travel to multiplier 33. Again driving mechanism 50—which may be an electromagnetic moving coil system—actuates switch 32 synchronously with the displacement of blade 49.

Figure 5:
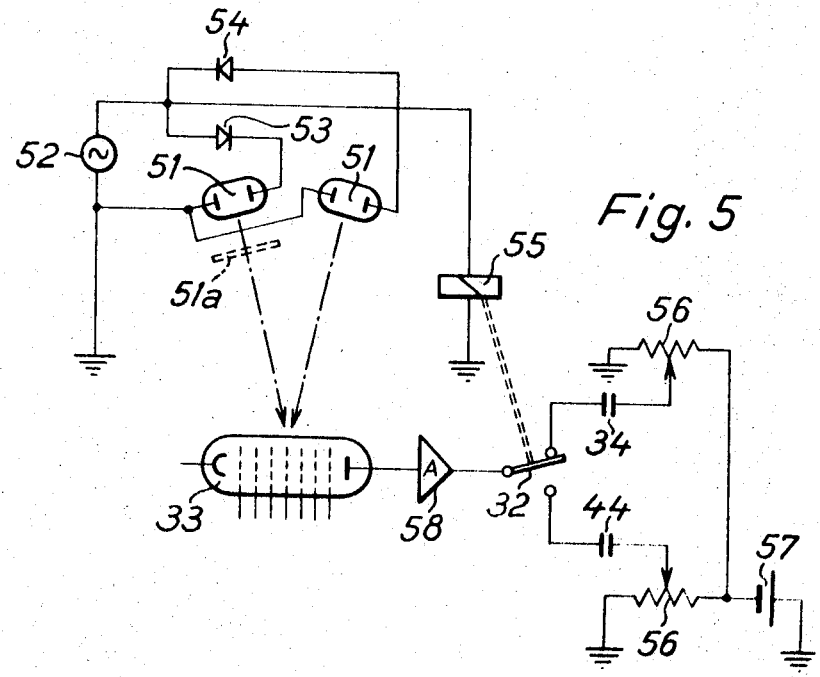
FIG. 5 shows two lamps, one for generating the comparison beam, the other one for generating the measurement beam, both lamps being alternately switchable on and off.

It may be of advantage to cause the alternating illumination of the multiplier 33 not by mechanically switching of optical means but by electrically switching on and off two light sources, one of which generates the comparison beam and the other one generates the measurement beam. An embodiment of this nature is illustrated in FIG. 5. Two gas-discharge lamps 51 are charged by a common A-C source 52. One of said lamps generates the comparison beam as mentioned above, and the other one generates the measurement beam. Two rectifiers 53, 54 cause one lamp to be ignited by the positive half-wave and the other lamp to be ignited by the negative half-wave. The double throw switch 32 is controlled by a polarized relay 55 which is also charged by the A-C source 52.

The adjustment of this photometer may be achieved in various ways. It may, e.g., be done by inserting a filter or filters in the path of one or both beams as indicated in dotted lines by filter 51a in FIG. 5. Said filter or filters may be of variable transparency. However, it is also possible to achieve adjustment by accordingly proportioning the capacitors 34 and 44 or by introducing an auxiliary voltage into the circuit of the capacitors, e.g., by means of the potentiometers 56 which are connected to the D-C source 57 on one side and to the ground on the other. The sliding contact of said potentiometers 56 is connected to the ground terminal of the capacitors 34, 44.

By additionally introducing an amplifier 58 between the anode of multiplier 33 and the double throw switch 32 and/or by rectifying and smoothing both output currents of multiplier 33 one may disregard the condition: switching frequency $\geq$ highest rise frequency.

What I claim is:

1. Digital photoelectric radiation comparison apparatus comprising:
    (a) radiation source means for illuminating alternately a test dosimetric sample and a reference dosimetric sample to produce alternately a test radiation beam and a reference radiation beam, the intensity of said test and reference beams being proportional to the dosage to which the dosimetric samples have been exposed;
    (b) photoelectric receiver means responsive to said radiation beams to generate electrical signals proportional to the intensity of said beams;
    (c) electric circuit generating means responsive to said electric signals including R-C circuit means having a reference portion and a test portion wherein the ratio of the capacitance of the reference portion to the capacitance of the test portion is $1:n$, where $n$ represents the intensity of the reference beam in digital units, connected to the receiver means and responsive to the proportional electric signals to generate proportional signals having a saw tooth wave form whereby the wave form generated by the test portion will rise $n$ times while the wave form generated by the reference portion will rise once;
    (d) detecting means connected to the generating means for detecting the rise of the saw tooth wave forms and generating a reference control pulse by a trigger action of the reference saw tooth wave form and test control pulses by trigger actions of the test saw tooth wave forms whereby $n$ test control pulses will be produced while one reference control pulse is being produced;
    (e) amplifying means connected to the detecting means for amplifying the reference control pulse;
    (f) relay means connected to the amplifying means for starting and ending the operation of the comparison apparatus including switch means manually operable for starting the operation of the comparison apparatus and responsive to the amplified reference control pulse for ending the operation; and
    (g) indicator means connected to the detecting means for visually indicating the number of test control pulses generated thereby.

2. Digital photoelectric radiation comparison apparatus according to claim 1, wherein said radiation source means for producing alternately a test radiation beam and a reference radiation beam includes a shutter blade or blades, said shutter blade or blades being alternately positionable in the paths of said beams.

3. Digital photoelectric radiation comparison apparatus according to claim 1, wherein said radiation source means for producing alternately a test radiation beam and a reference radiation beam includes a reflecting means, said reflecting means being alternately positionable in the path of said beams for projecting either one of said beams onto said photoelectric receiver means.

4. Digital photoelectric radiation comparison apparatus according to claim 1, wherein said radiation source means for producing alternately a test radiation beam and a reference radiation beam includes a plurality of light sources, one of said light sources illuminating the test dosimetric sample and the other of said light sources illuminating the reference dosimetric sample, said light sources being alternately switchable, on and off.

5. Digital photoelectric radiation comparison apparatus according to claim 4 in which said light sources consist of two gas discharge lamps, said lamps being charged by an A-C source, one lamp being ignited by the positive half-wave, the other lamp being ignited by the negative half-wave of the A-C source.

References Cited

UNITED STATES PATENTS

| | | | |
|---|---|---|---|
| 3,109,094 | 10/1963 | Marshall et al. | 250—71 |
| 3,255,355 | 6/1966 | Frenk et al. | 356—205X |
| 3,408,142 | 10/1968 | Hunt et al. | 356—175X |
| 3,427,273 | 2/1969 | Newing, Jr. | 250—71X |
| 3,435,239 | 3/1969 | Stalberg | 250—218 |

FOREIGN PATENTS

| | | | |
|---|---|---|---|
| 833,633 | 4/1960 | Great Britain | 356—205 |
| 1,254,727 | 1/1961 | France | 356—226 |
| 896,438 | 5/1962 | Great Britain | 356—204 |
| 1,164,117 | 2/1964 | Germany | 356—226 |

OTHER REFERENCES

Pal, A. B., "Sensitive Ultraviolet Meters," Rev. Sci. Instr., 19 (8), August 1948, pp. 529–32.

Klose, E., "A New Integrator With Digitalizer for a Known Dose-Rate Meter" (in German), Rad. Biol. Ther., vol. 6, July 1965, pp. 377–9.

Hekrdle, J., "Digital Photometer for Film Dosimetry," Jaderna Energie, 11, December 1965, pp. 452–5.

RONALD L. WIBERT, Primary Examiner

R. J. WEBSTER, Assistant Examiner

U.S. Cl. X.R.

250—71, 83, 207, 218; 356—230, 204, 205, 206